Patented Sept. 23, 1941

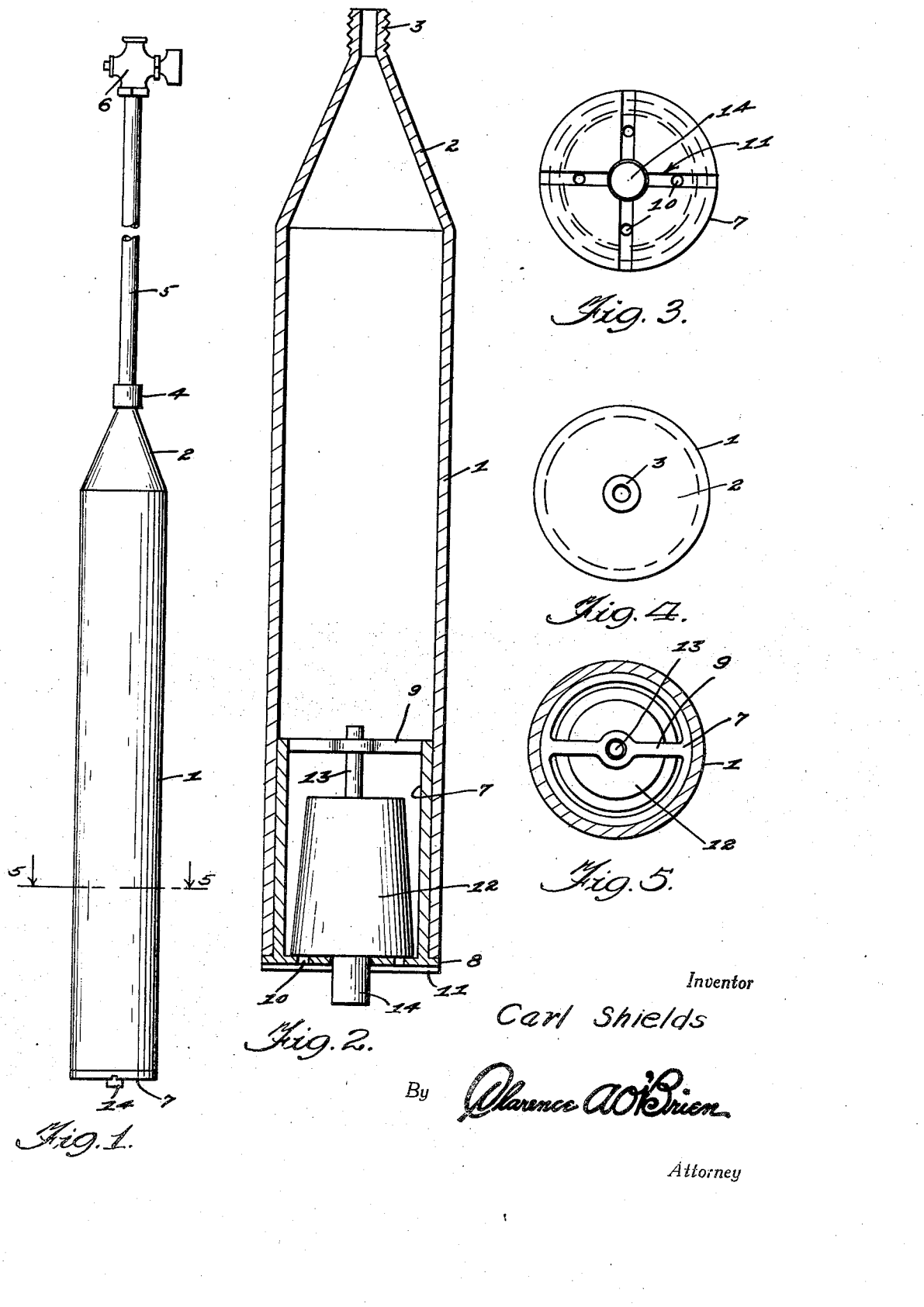

2,256,767

UNITED STATES PATENT OFFICE 2,256,767

STORAGE TANK CLEANER

Carl Shields, Pomeroy, Ohio

Application September 7, 1940, Serial No. 355,878

1 Claim. (Cl. 210—208)

This invention relates to a cleaner for storage tanks such as are used for gasoline, oil and the like, the general object of the invention being to provide a device for removing water, rust, sediment and the like from the bottom of the tank without removing the gasoline, oil or other contents of the tank.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is an elevational view of the device.

Figure 2 is a longitudinal sectional view through the cylindrical part of the device with the valve in elevation.

Figure 3 is a bottom plan view of the valve cage.

Figure 4 is a top plan view of the body of the device.

Figure 5 is a section on the line 5—5 of Figure 1.

In these views the numeral 1 indicates the body of the device which is made in the form of a cylinder having its bottom open and with its top of conical shape as shown at 2 with this part 2 terminating in a nipple 3 which is exteriorly threaded for receiving a collar 4 at the lower end of a tube 5 which has a manually operated valve 6 at its upper end. A valve cage 7 is pressed into the lower end of the cylindrical body and has a flange 8 at its lower end which engages the end of the body and a spider or cross bar 9 extends across the top of the cage and has a centrally arranged hole therein. The bottom of the cage is also formed with a centrally arranged hole therein which is of larger diameter than the hole in the bar 9 and said bottom of the cage is also formed with the holes 10 and the grooves 11 in its lower face into which the holes 10 open out as shown in Figures 2 and 3. The valve is shown at 12 and is preferably formed of solid brass so that it will have considerable weight. A stem 13 extends upwardly from the center at the top of the valve and passes through the hole in the bar 9 while a larger stem or shank 14 depends from the central portion of the lower end of the valve passing through the large hole in the bottom of the cage. The valve 12 is of frusto-conical shape as shown so that it will have free movement in the cage but when the valve is in lowered position its lower end will cover the openings or holes 10 as shown in Figure 2.

The device may be made of different sizes and the size of the cleaner used for cleaning a certain size tank depends on the size of the opening in the top of the tank as, of course, the device must be passed through such opening and the length of the device depends on the depth of the tank to be cleaned as the upper end of the tube 5 must project through the opening in the top of the tank.

In using the device it is passed through the opening in the top of the tank and, of course, while this is being done the valve 12 remains seated on the bottom of the cage so as to close the openings 10 as well as the opening through which the stem 14 passes but when the device drops upon the bottom of the tank the engagement of the stem 14 with the bottom of the tank will force the valve 12 upwardly so as to uncover the opening 10. Then valve 6 is open, this valve being closed before the device is passed into the tank and thus the water, sediment and the like in the lower part of the tank will pass into the cylinder 1 through the holes 10. When the device is full the valve 6 is closed and the cleaner is then lifted from the bottom of the tank and as soon as the stem 14 leaves the bottom of the tank the valve 12 is closed and thus holds all the matter that has entered the cylinder 1 therein. After the device is taken from the tank the valve 6 is open and the device tilted so that the contents thereof can flow out of the valve 6. When most of the water and other objectionable material has been removed from the bottom of the tank the remainder is removed by the device and without removing any of the gasoline, oil or other contents of the tank by opening the valve 6, a little at a time, so that the release of air from the device is slow and this gives the water and other material which are to be removed, time to flow to the bottom of the device so that the same can be drawn into the cleaner itself. Thus practically all of the objectionable material can be removed from the bottom of the tank without the loss of any of the contents of the tank. By providing the conical top 2 the passage of the device through the opening in the top of the tank will be facilitated and by providing the grooves 11 the flow of water and the like from the tank into the cleaner, when the device is resting on the bottom of the tank, is facilitated.

Of course, the above operation is repeated until all objectionable matter is removed from the tank.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A tank cleaner of the class described comprising a cylindrical body having its lower end open and having a conical part at its upper end terminating in a nipple, a tube having its lower end connected with the nipple, a manually operated valve at the upper end of the tube, a valve cage pressed into the lower end of the body and having a centrally arranged hole in its bottom and other holes in said bottom forming inlet openings, a valve of considerable weight carried by the cage and having a stem depending through the central opening and adapted to engage the bottom of the tank to force the valve upwardly to uncover the inlet openings, the bottom of the cage having radiating grooves therein in communication with all the openings and extending through the periphery of the bottom and a cross member at the top of the cage forming a guide for the valve.

CARL SHIELDS.